(12) United States Patent
Kawabe et al.

(10) Patent No.: US 8,957,768 B2
(45) Date of Patent: Feb. 17, 2015

(54) OPERATION APPARATUS

(75) Inventors: Hideo Kawabe, Saitama (JP);
Masatoshi Ueno, Kanagawa (JP);
Shinobu Kuriya, Kanagawa (JP);
Yusaku Kato, Tokyo (JP); Kenichi Kabasawa, Saitama (JP); Tetsuro Goto, Kanagawa (JP); Tsubasa Tsukahara, Tokyo (JP); Toshiyuki Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 255 days.

(21) Appl. No.: 13/435,336

(22) Filed: Mar. 30, 2012

(65) Prior Publication Data

US 2012/0256739 A1  Oct. 11, 2012

(30) Foreign Application Priority Data

Apr. 6, 2011  (JP) ................................ 2011-084149

(51) Int. Cl.
| | |
|---|---|
| *G08B 6/00* | (2006.01) |
| *B25J 13/02* | (2006.01) |
| *B25J 13/08* | (2006.01) |
| *A63F 13/20* | (2014.01) |
| *G06F 3/01* | (2006.01) |
| *G06F 3/041* | (2006.01) |
| *G06F 3/0346* | (2013.01) |

(52) U.S. Cl.
CPC .............. *B25J 13/025* (2013.01); *B25J 13/081* (2013.01); *A63F 13/06* (2013.01); *G06F 3/016* (2013.01); *G06F 3/0414* (2013.01); *G06F 3/0346* (2013.01); *A63F 2300/105* (2013.01); *A63F 2300/1068* (2013.01)
USPC ...................... 340/407.2; 340/407.1; 340/506; 340/657; 340/693.5; 340/693.6

(58) Field of Classification Search
USPC .......... 340/407.1, 407.2, 506, 657, 65, 693.5, 340/693.6
See application file for complete search history.

(56) References Cited

U.S. PATENT DOCUMENTS

| | | | |
|---|---|---|---|
| 6,447,448 B1 * | 9/2002 | Ishikawa et al. ............... | 600/300 |
| 2008/0015058 A1 * | 1/2008 | Noble et al. ................... | 473/423 |
| 2008/0286733 A1 * | 11/2008 | Claudel et al. ................ | 434/251 |
| 2009/0003136 A1 * | 1/2009 | Karr .............................. | 367/128 |

FOREIGN PATENT DOCUMENTS

| | | |
|---|---|---|
| JP | 07-219704 A | 8/1995 |
| JP | 2005-267174 A | 9/2005 |

* cited by examiner

*Primary Examiner* — Daryl Pope
(74) *Attorney, Agent, or Firm* — Wolf, Greenfield & Sacks, P.C.

(57) ABSTRACT

An operation apparatus includes a base, a sensing unit, a plurality of plates, and a drive mechanism. The base has a surface. The sensing unit includes at least three pressure-sensitive detection regions that are provided at different vertex positions of a polygon having at least three corners set in each of a plurality of regions obtained by partitioning at least a part of the surface of the base. The plurality of plates are provided to correspond to the plurality of regions and cover the at least a part of the surface. The drive mechanism is configured to drive the plurality of plates on the basis of a signal generated by detection of the sensing unit.

9 Claims, 7 Drawing Sheets

OPERATION APPARATUS

BACKGROUND

The present disclosure relates to an operation apparatus that is operated by a user and is capable of providing a sense of touch in accordance with an operation of the user.

Japanese Patent Application Laid-open No. Hei 7-219704 discloses a virtual world expression device such as a television game machine or a virtual reality device that can express a virtual world more realistically. This device is provided with a handle part to be grasped and operated by a player. To a surface of the handle part, a pad for grasp that is formed of rubber or the like is fixed. At positions of the pad that correspond to five fingers of one hand of a human, five electromagnetic solenoids are arranged. To the inside of each electromagnetic solenoid, a pressure sensor that detects a pressure generated by a movement of a rod that expands and contracts is provided, and when the player grasps the pad, the holding force is detected by the pressure sensors. Thus, the player can make some action to the virtual world.

The virtual world expression device drives the electromagnetic solenoids on the basis of detection signals by the pressure sensors so as to feed back information on a character represented on a display of the virtual world expression device to the player. The player recognizes that information by a sense of touch (see, for example, paragraphs [0012], [0015], and [0021], FIGS. 3 and 7, and the like of the specification of Japanese Patent Application Laid-open No. Hei 7-219704).

Japanese Patent Application Laid-open No. 2005-267174 discloses a ball-type touch device that includes a pressure sensor that detects a pressure at which a person who operates the device grasps the device, and a linear actuator that causes the surface of a ball to be deformed in accordance with the pressure (see, for example, paragraphs [0016], [0020], and [0029], FIG. 1, and the like of the specification of Japanese Patent Application Laid-open No. 2005-267174). This ball-type touch device is used as a device for remote-controlling a robot arm, for example.

SUMMARY

In the operation devices as described above, there is a demand for improvement of detection accuracy of a pressurizing force generated when a user operates the operation device.

In view of the circumstances as described above, it is desirable to provide an operation apparatus capable of improving detection accuracy of a pressurizing force by a user or the like.

According to an embodiment of the present disclosure, there is provided an operation apparatus including a base, a sensing unit, a plurality of plates, and a drive mechanism.

The base has a surface.

The sensing unit includes at least three pressure-sensitive detection regions that are provided at different vertex positions of a polygon having at least three corners set in each of a plurality of regions obtained by partitioning at least a part of the surface of the base.

The plurality of plates are provided to correspond to the plurality of regions and cover the at least a part of the surface.

The drive mechanism is configured to drive the plurality of plates on the basis of a signal generated by detection of the sensing unit.

At least three pressure-sensitive detection regions that are provided at different vertex positions of a polygon having at least three corners make it possible to detect a pressure applied to the plurality of plates provided so as to correspond to the plurality of regions. Therefore, detection accuracy of a pressurizing force by a user or the like can be improved.

The drive mechanism may include a plurality of actuators that are each provided between the surface of the base and each of the plurality of plates. By those actuators, the plurality of plates can be driven.

The drive mechanism may include a drive source that is provided within the base and causes the plurality of actuators to individually generate a drive force.

The plurality of actuators may be bellows that are driven by a fluid pressure or may be electric actuators that are electrically driven.

The base may have a spherical shape. Since the base has a spherical shape, it is possible to achieve various ways for a user to grasp the base.

The plurality of plates may include eight triangular plates that cover the entire surface of the base. Since the plurality of plates cover the entire surface of the base, it is possible to detect a pressurizing force from various directions and drive the plates in various directions.

The operation apparatus may further include a position sensor that is provided within the base and detects a position of the base. Since the position sensor detects a position of the base, it is possible to use this operation apparatus as a space operation device.

The operation apparatus may further include a cover sheet that covers the plurality of plates. With this structure, a user can use this operation apparatus even under a contaminated environment.

As described above, according to the present disclosure, it is possible to improve detection accuracy of a pressurizing force by a user or the like in the operation apparatus.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

Structure of Operation Apparatus

Figure 1:
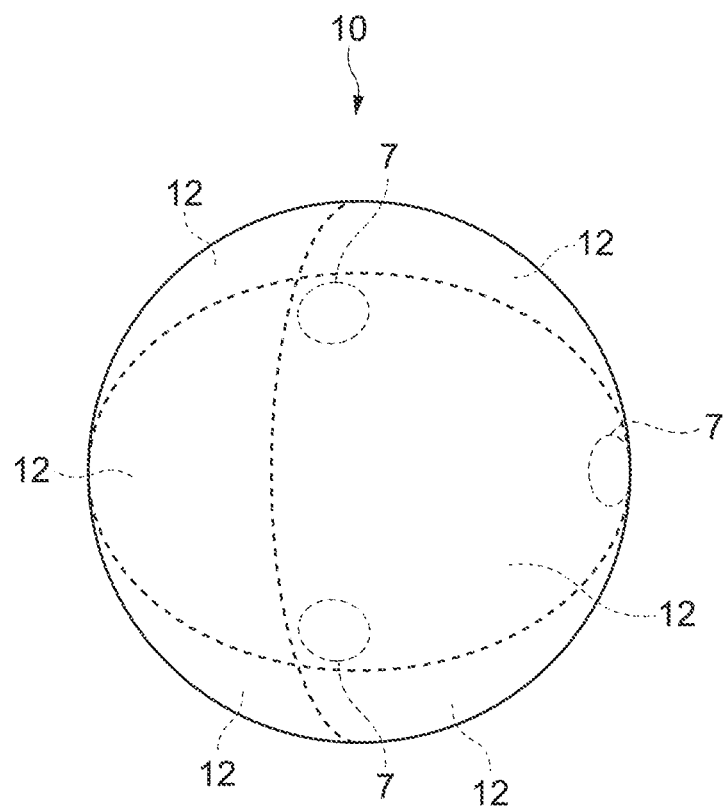
FIG. 1 is an outer appearance view showing an operation apparatus according to a first embodiment of the present disclosure.
Figure 2:
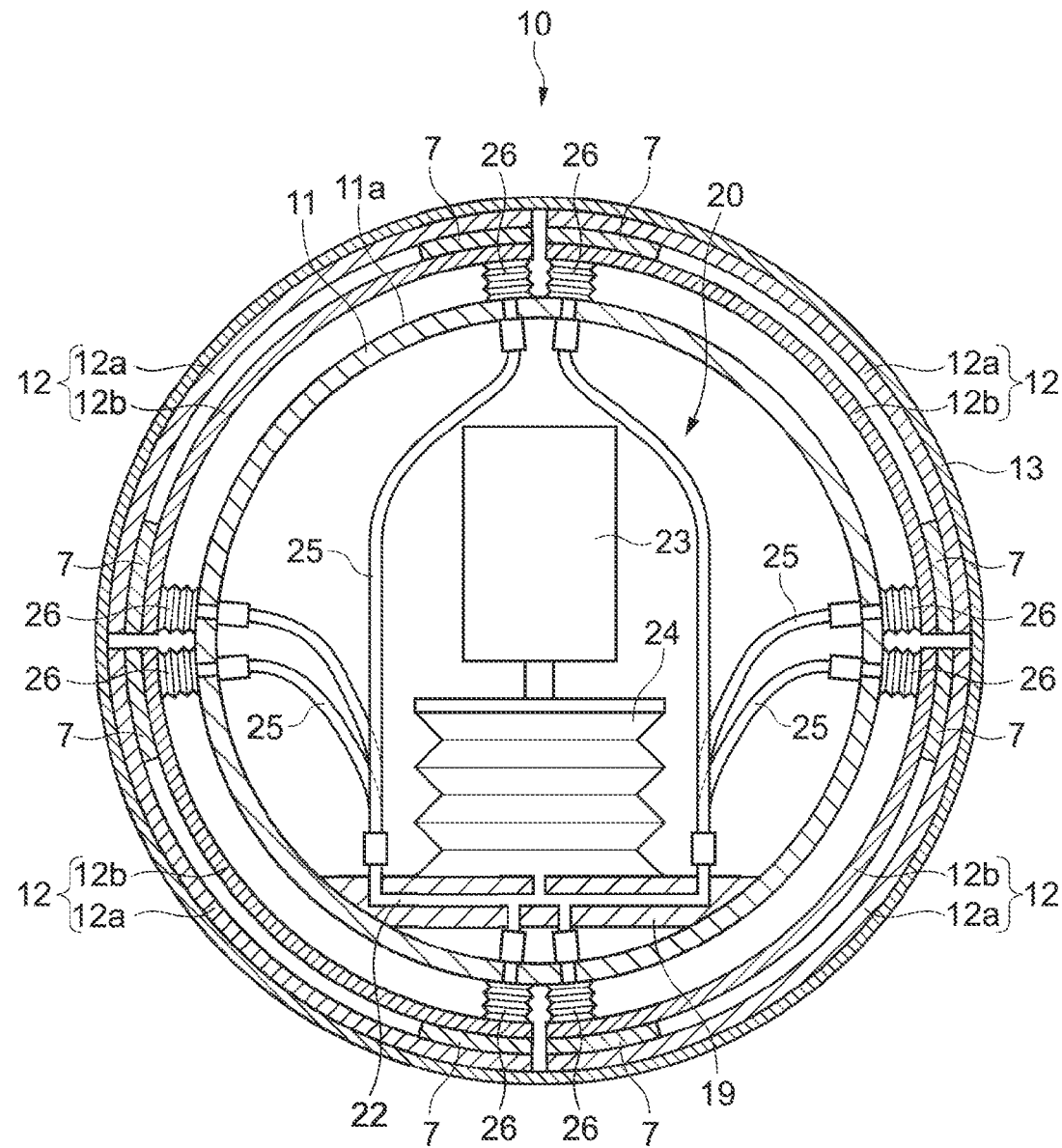
FIG. 2 is a cross-sectional view showing the operation apparatus.

FIG. 1 is an outer appearance view showing an operation apparatus according to a first embodiment of the present disclosure, and FIG. 2 is a cross-sectional view showing the operation apparatus.

An operation apparatus 10 substantially has an outer appearance of a sphere and typically has a size in which the operation apparatus 10 can be grasped with a hand of a human.

As shown in FIG. 2, the operation apparatus 10 includes a hollow base 11 having a spherical shape. On a surface 11a of the base 11, a plurality of plates 12 are provided to cover the surface 11a. As shown in FIG. 1, the plurality of plates 12 are arranged so as to correspond to a plurality of regions obtained by partitioning the entire surface 11a of the base 11, for example. In this embodiment, for example, the surface of the base 11 is partitioned into eight regions each having substantially the same shape and area, and the plurality of plates 12 are arranged so as to correspond to the eight regions on a one-to-one basis. The shape of the plurality of plates 12 is spherical so as to correspond to those regions of the surface 11a of the base 11.

The plurality of plates 12 typically have substantially the same structure and function. Therefore, in the following description, except the case where there is a need to explain the plurality of plates 12, the structure, the function, and the like of one plate 12 will be described.

The plate 12 includes an upper (outer) plate 12a, a lower (inner) plate 12b, and pressure-sensitive sensors 7 interposed therebetween.

As shown in FIG. 1, the pressure-sensitive sensors 7 are provided at positions where pressure-sensitive detection regions are arranged at different vertex positions of a polygon having three or more corners set in each region of the surface 11a of the base 11. In this embodiment, the shape of each region is triangular, and the three pressure-sensitive sensors 7 are arranged at those three vertex positions of the triangle so that the three pressure-sensitive sensors 7 constitute a sensing unit.

The pressure-sensitive sensors 7 are each formed to have a sheet shape, for example. As the pressure-sensitive sensor 7, a sensor capable of detecting a change in electrical resistance, such as a strain gauge, is typically used, but a sensor using a piezoelectric element, or the like may be used.

A material, a thickness, and the like of the plate 12 are set as appropriate so that the plate 12 obtains rigidity at a certain level or more at which the plate 12 is not deformed by a pressurizing force in a range caused by a human or at which the plate 12 does not suppress transmission of a force to the pressure-sensitive sensors 7 by coming into contact with the surface 11a of the base 11.

The operation apparatus 10 further includes a drive mechanism 20 that drives the plurality of plates 12 integrally (all together) on the basis of pressures detected by those sensing units.

The drive mechanism 20 includes bellows 26 as actuators provided between the surface of the base 11 and the plates 12. Those bellows 26 are arranged at positions corresponding to those of the pressure-sensitive sensors 7, for example. In other words, one plate 12 is provided with three bellows 26 correspondingly to the positions of the pressure-sensitive sensors 7. The plurality of plates 12 are elastically supported with respect to the base 11 by those bellows 26.

The drive mechanism 20 includes a drive source 23 and a center bellows 24 that are provided within the base 11. The drive source 23 includes, for example, a motor and a conversion mechanism that converts a rotational movement of the motor to a linear movement, which are not shown in the figures.

As the motor, for example, a servo motor is used. As the conversion mechanism, for example, a ball screw mechanism, a rack and pinion mechanism, or the like is used.

As the center bellows 24, a bellows having a larger flow rate of a fluid (for example, air) than the different bellows 26 is used, and the size of the center bellows 24 is large. The center bellows 24 is supported by a support member 19 provided within the base 11 so as not to move in the base 11. The drive source 23 is also supported by a support member (not shown) so as not to move in the base 11.

The center bellows 24 is connected to a plurality of tubes 25 via an air flow passage 22 provided to the support member 19. The plurality of tubes 25 are individually connected to the respective bellows 26.

According to the structure of the drive mechanism 20 as described above, the drive source 23 can cause each bellows 26 to generate a drive force. Specifically, the drive source 23 causes the center bellows 24 to expand and contract, and accordingly an internal volume of the center bellows 24 changes and in accordance with the change, internal pressures of the center bellows 24, the respective tubes 25, and the respective bellows 26 change. Accordingly, the bellows 26 expand and contract to generate a drive force, and the plates 12 are driven by the same drive force substantially at the same time.

The surfaces of the plurality of plates 12 are covered with a cover sheet 13. The cover sheet 13 is formed of rubber or resin, for example, a silicon rubber or a silicon resin. By being covered with the cover sheet 13 in this way, the operation apparatus 10 can be used by a user even under a contaminated environment. For example, dust, dirt, a sweat of the user, and the like can be prevented from sticking to the surface 11a of the base 11 or entering the base 11 via clearances between the plates 12. Further, as a result of preventing dust and the like from entering the clearances between the plates 12, a desired mechanical movement of the plates 12 can be ensured.

In particular, in the case where the base 11 has a spherical shape, since the shape is simple, a worker can put the cover sheet 13 on the plates 12 easily in the manufacture of the operation apparatus 10.

Figure 3:
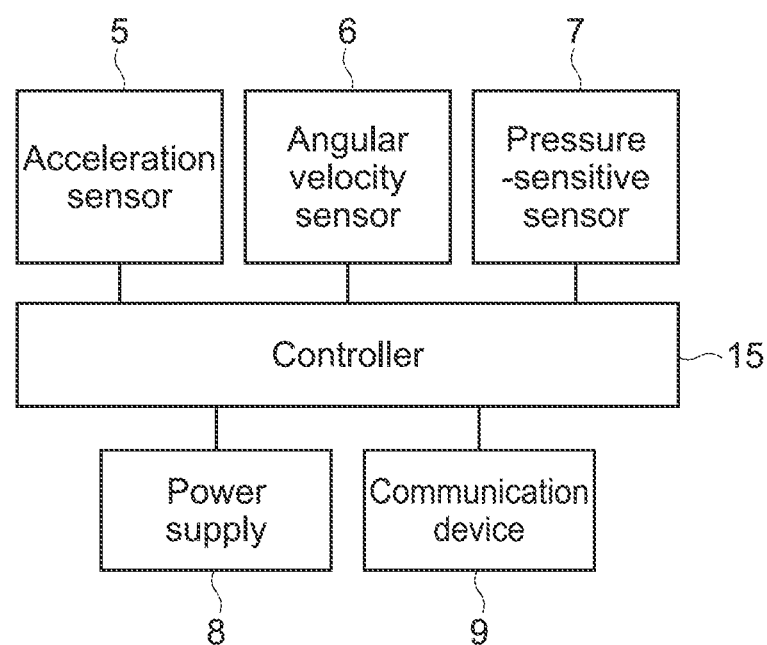
FIG. 3 is a block diagram showing an electrical structure of hardware of the operation apparatus.

FIG. 3 is a block diagram showing an electrical structure of hardware of the operation apparatus 10. The operation apparatus 10 includes an acceleration sensor 5, an angular velocity sensor 6, the pressure-sensitive sensor 7, a controller 15, a communication device 9, a power supply 8, and the like.

Those components of the sensors 5 and 6, the controller 15, and the like, except the pressure-sensitive sensor 7, are mounted onto a circuit board (not shown) provided within the base 11. The circuit board is fixed to the base 11.

The communication device 9 has a function of transmitting information including a control signal and the like calculated by the controller 15 on the basis of detection signals obtained by the sensors 5, 6, and 7, to other devices (not shown). Further, the communication device 9 has a function of receiving information from other devices.

"Other devices" used herein refer to operation target devices to be operated by the operation apparatus 10, for example. The communication device 9 transmits and receives signals in a wired or wireless manner. For wireless communication, for example, infrared rays and a microwave are used.

The operation apparatus 10 includes, for example, the acceleration sensor 5 having three detection axes orthogonal to one another and the angular velocity sensor 6 having three detection axes orthogonal to one another, and accordingly an acceleration and a rotational velocity of the operation apparatus 10 in all directions of a three-dimensional space are calculated. Further, using those sensors 5 and 6, an absolute (unique) position of the operation apparatus 10 in the three-dimensional space can also be calculated.

The acceleration sensor 5 and the angular velocity sensor 6 function as position sensors that detect a position of the operation apparatus 10. Since those sensors 5 and 6 detect the position of the base 11, the operation apparatus can be used as a space operation device (for example, space pointing device or space mouse). In particular, in the case where the base 11 has a spherical shape, various ways for a user to grasp the operation apparatus 10 can be realized, and irrespective of the ways to grasp the operation apparatus 10, the position of the operation apparatus 10 can be detected by the sensors 5 and 6, which is convenient.

The operation apparatus 10 may also include a geomagnetic sensor in addition to the acceleration sensor 5 and the angular velocity sensor 6. Accordingly, the number of detection axes of the acceleration sensor 5 and angular velocity sensor 6 can be reduced, or the detection accuracy of a position or a movement of the operation apparatus 10 can be improved.

The controller 15 includes, though not illustrated, a CPU (Central Processing Unit), a RAM (Random Access Memory), a ROM (Read Only Memory), and the like.

A program for executing predetermined computation processing based on an acceleration, an angular velocity, and a pressure that are obtained by at least the sensors 5, 6, and 7 is stored in the ROM. Further, a program for generating a control signal (signal generated by detection of the sensing unit) to be output to a drive source on the basis of the pressure detected by the pressure-sensitive sensor 7 is stored in the ROM.

For example, as will be described later, the program for generating a control signal is a program for computing, on the basis of detection information of the pressure-sensitive sensors 7, a position against which a contact object such as a finger of a user hits on the plate 12 corresponding to the relevant region (pressurized position), and a pressurizing force.

The controller 15 is not limited to the CPU, and devices including a PLD (Programmable Logic Device) such as an FPGA (Field Programmable Gate Array), and an ASIC (Application Specific Integrated Circuit) may be used.

(Method of Calculating Pressurized Position And Pressurizing Force)

Next, a method of detecting a pressurized position and a pressurizing force for one plate 12 will be described. For the sake of simplification of description, the plate 12 is assumed to be a flat plate.

Figure 4A:
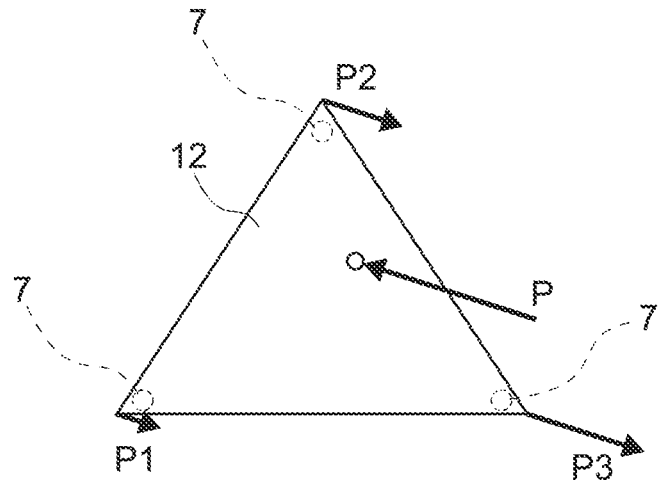
FIGS. 4A and 4B are a plan view and a side view for describing a detection principle of a pressurized position and a pressurizing force by a sensing unit.
Figure 4B:
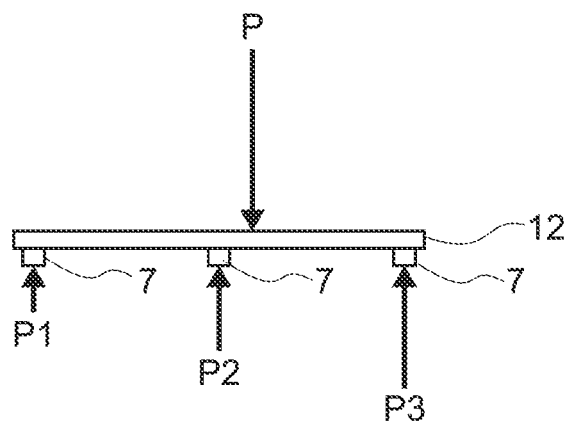

FIGS. 4A and 4B are a plan view and a side view for describing the detection principle.

It is assumed that three pressure-sensitive sensors 7 capable of detecting a pressure applied to the plate 12 as three partial pressures are set so as to correspond to positions of respective corners of a triangular plate-like plate 12. Here, assuming that a force P is applied to an optional position serving as a pressurized position on the plate 12, this pressurizing force P is dispersed on the plate 12 to be divided and imparted to the three pressure-sensitive sensors 7 arranged so as to correspond to the three corners of the plate 12. Specifically, in the case where forces applied to the three pressure-sensitive sensors 7 are represented by P1, P2, and P3, respectively, a relational expression of P=P1+P2+P3 is established. In other words, even when the force P is applied to any position of the plate 12, the force P can be detected as a sum of output values P1, P2, and P3 of the three pressure-sensitive sensors 7.

Figure 5:
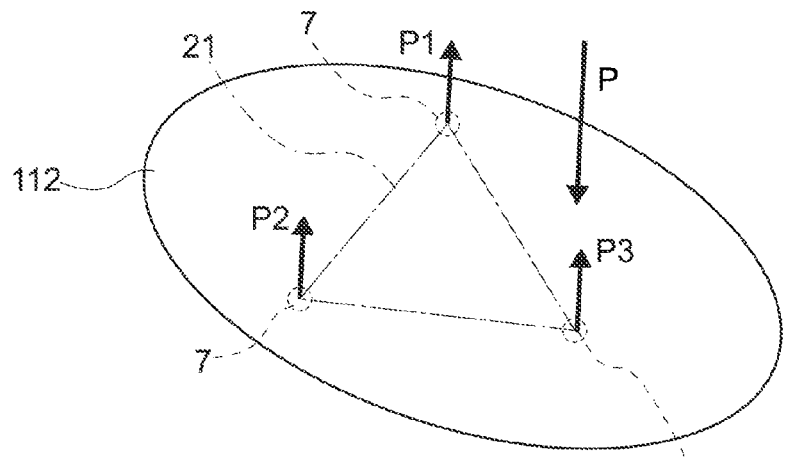
FIG. 5 is a diagram for describing a detection principle in the case where pressure-sensitive sensors corresponding to positive and negative pressures are used.

For example, as shown in FIG. 5, in the case where an area of a plate 112 is larger than that of a region 21 thereof and rigidity of the plate 112 is relatively small, pressure-sensitive sensors 7 that support positive and negative pressures only need to be used. In this case, for example, even when a force P is applied to a pressurized position that is out of the triangular region 21 having three sensor positions as vertices, the force P applied to the plate 112 can be calculated in a similar method. For example, when a pressure P is applied, there may be a case where pressures P1 and P3 are applied in a positive direction (the same direction as pressure P) and a pressure P2 is applied in a negative direction. However, in the case where the rigidity of the plate 112 is sufficiently high, when the pressure P is applied, there may be a case where a direction of the pressures of the three pressure-sensitive sensors 7 is a positive direction, which is the same as the pressure P.

Next, a method of calculating a pressurized position will be described with reference to FIG. 6.

Figure 6:
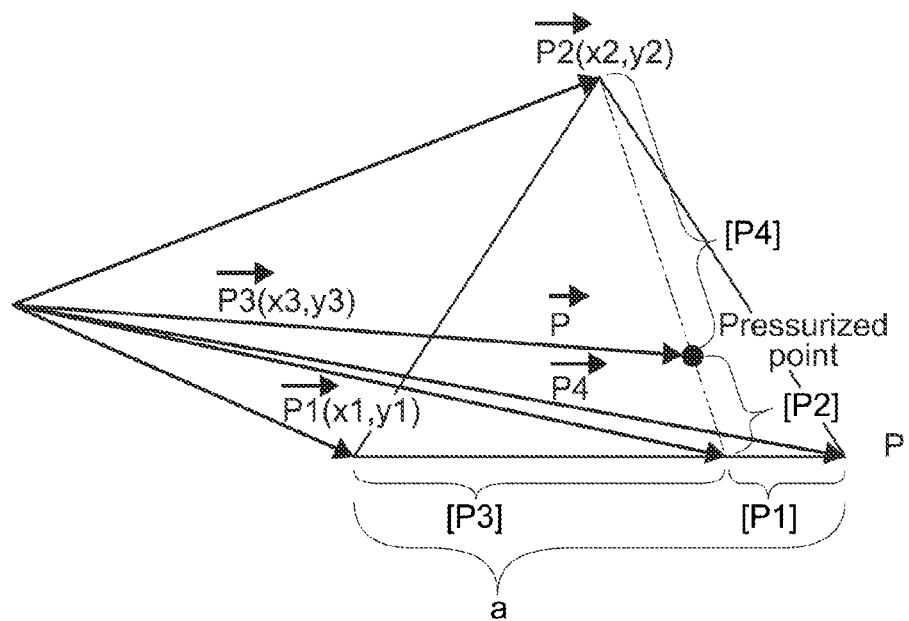
FIG. 6 is a diagram for describing a method of calculating a pressurized position.

Since the positions of the pressure-sensitive sensors 7 are already known, position vectors P1, P2, and P3 as shown in FIG. 6 can be drawn. Here, a position vector P4 of a point obtained by dividing a side "a" of the triangle by a ratio of the output values of the pressure-sensitive sensors 7, that is, a ratio of [P3]:[P1], can be expressed as follows.

$$P4=(P1\times[P3]+P3\times[P1])/[P1]+[P3] \quad (1)$$

$$[P4]=[P1]+[P3]$$

Here, the pressurized position P exists on a line connecting the point P4 and the point P2 and is at a point obtained by dividing this line by a ratio of the [P4] calculated in the above expression and the sensor output [P2], that is, a ratio of [P4]:[P2]. Therefore, similarly to the above expression, the position vector P of the pressurized position is expressed as follows.

$$P=(P2\times[P4]+P4\times[P2])/[P2]+[P4] \quad (2)$$

$$[P]=[P2]+[P4]=[P1]+[P2]+[P3]$$

In other words, a force applied to the pressurized position and a position thereof can be correctly calculated with the output values from the three pressure-sensitive sensors 7.

Here, the number of pressure-sensitive sensors 7, that is, three, is a minimum number for calculating a position and a magnitude of a force applied to one plane in a vector calculation. Even when this number is increased to four or more, the same calculation method can be used.

Figure 7:
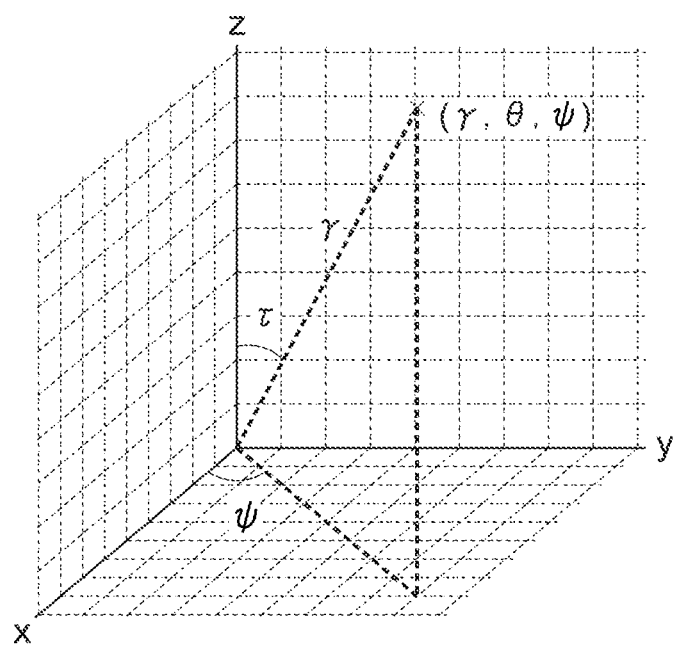
FIG. 7 is a diagram for describing a method of calculating a pressurized position in the case where a base has a three-dimensional shape such as a spherical shape.

The principle described above can be applied to any surface of an object having a three-dimensional shape, such as a sphere. In the case of the spherical plate 12 as in this embodiment, polar coordinates as shown in FIG. 7 can be used for the vector calculation.

If the vector expression (2) above is described in polar coordinates, the following expressions are obtained.

$$P=(([P3]\times\psi1+[P1]\times\psi3)/([P1]+[P3]),([P3]\times\tau1+[P1]\times\tau3)/([P1]+[P3]),r) \quad (3)$$

$$[P]=[P2]+[P4]=[P1]+[P2]+[P3]$$

$$P=(([P4]\times\psi2+[P2]\times\psi4)/([P2]+[P4]),([P4]\times\tau2+[P2]\times\tau4)/([P2]+[P4]),r) \quad (4)$$

$[P]=[P2]+[P4]=[P1]+[P2]+[P3]$ (where r=radius of sphere.)

Even in the case where an object has a surface of an optional shape such as a spherical surface or a cylindrical surface, if the surface is partitioned into some regions and shapes of the regions are approximated as coordinates corresponding to the surface shape of each region, such as plane coordinates, polar coordinates, and cylindrical coordinates, the above-mentioned technique makes it possible to calculate a pressurized position and a pressurizing force with respect to the entire surface of the object having the optional shape.

It should be noted that on the surface of the optional shape, partitioned regions have to be provided by the number of coordinate systems necessary for approximating the shapes of the regions over the surface.

As described above, with the operation apparatus 10 according to this embodiment, the three or more pressure-sensitive detection regions that are provided at different vertex positions of a polygon having three or more corners allows a pressure applied to the plates 12 provided in a plurality of regions to be detected. Therefore, it is possible to improve detection accuracy of a pressurizing force by a user or the like even when the number of sensors is relatively small.

Further, since the operation apparatus 10 has a spherical shape, it is possible to achieve various ways for the user to grasp the operation apparatus 10.

In particular, the operation apparatus 10 according to this embodiment can be applied to 3D virtual reality (for example, game). In the case where a 3D object in the virtual reality is assumed to be an operation target, this operation apparatus 10 can generate a feeling that a user obtains when the user touches or grasps the 3D object.

(Application Example of Operation Apparatus)

The operation apparatus 10 can be widely used in industrial use application and general-use application for consumers.

In the industrial use application, the operation apparatus 10 is a master apparatus and an operation target device of the operation apparatus 10 is a slave apparatus such as a robot. The robot is remote-controlled by this operation apparatus 10. For example, a worker operates the operation apparatus 10 so that an arm and the like of the robot can be moved.

Further, by operating the operation apparatus 10 as a master apparatus, a doctor and the like can remotely control a medical treatment (surgery) robot as a slave apparatus. In this case, the following application example can also be conceived as a technique using the pressure-sensitive sensor 7. For example, in the case where a doctor performs palpation and the like, when the doctor touches the operation apparatus 10, the controller 15 detects a pressurized position and a pressurizing force of the touch and transmits information thus obtained to the robot. The robot including the pressure-sensitive sensor 7 and the like comes into contact with a patient on the basis of the received information and detects a pressure obtained by a counteraction by the pressure-sensitive sensor 7. The robot transmits the information of the pressure obtained by the pressure-sensitive sensor 7 to the operation apparatus 10. The controller 15 of the operation apparatus 10 outputs a control signal corresponding to the pressure obtained by the robot to the drive source 23 on the basis of the received information, to thereby drive the bellows 26. In such a manner, the operation apparatus 10 can feed back a tactile impression of the patient to the doctor.

In the general-use application for consumers, the operation apparatus 10 is used as a space pointing device as described above. The operation apparatus 10 may have a function of a mouse used for a PC (Personal Computer).

Alternatively, the operation apparatus 10 is used as a controller of a game console. For example, the following use application can be conceived, in which when a user grasps the operation apparatus 10, the user grasps in virtual reality an object (for example, character such as animal) on software displayed on a display. In this case, the controller 15 of the operation apparatus 10 detects a pressurized position and a pressurizing force by a user with use of the sensing unit, and drives the drive mechanism 20 based on the information of the pressurized position and the pressurizing force. Various drive forces generated by the drive mechanism 20 can express a state of a character, such as a tremor when the character struggles and various emotions of delight, anger, sorrow, and pleasure.

Alternatively, a user can grasp a soft object such as a tofu (bean curd) in virtual reality, and by feedback thereof, the user can obtain a tactile impression of the object.

Second Embodiment

Figure 8:
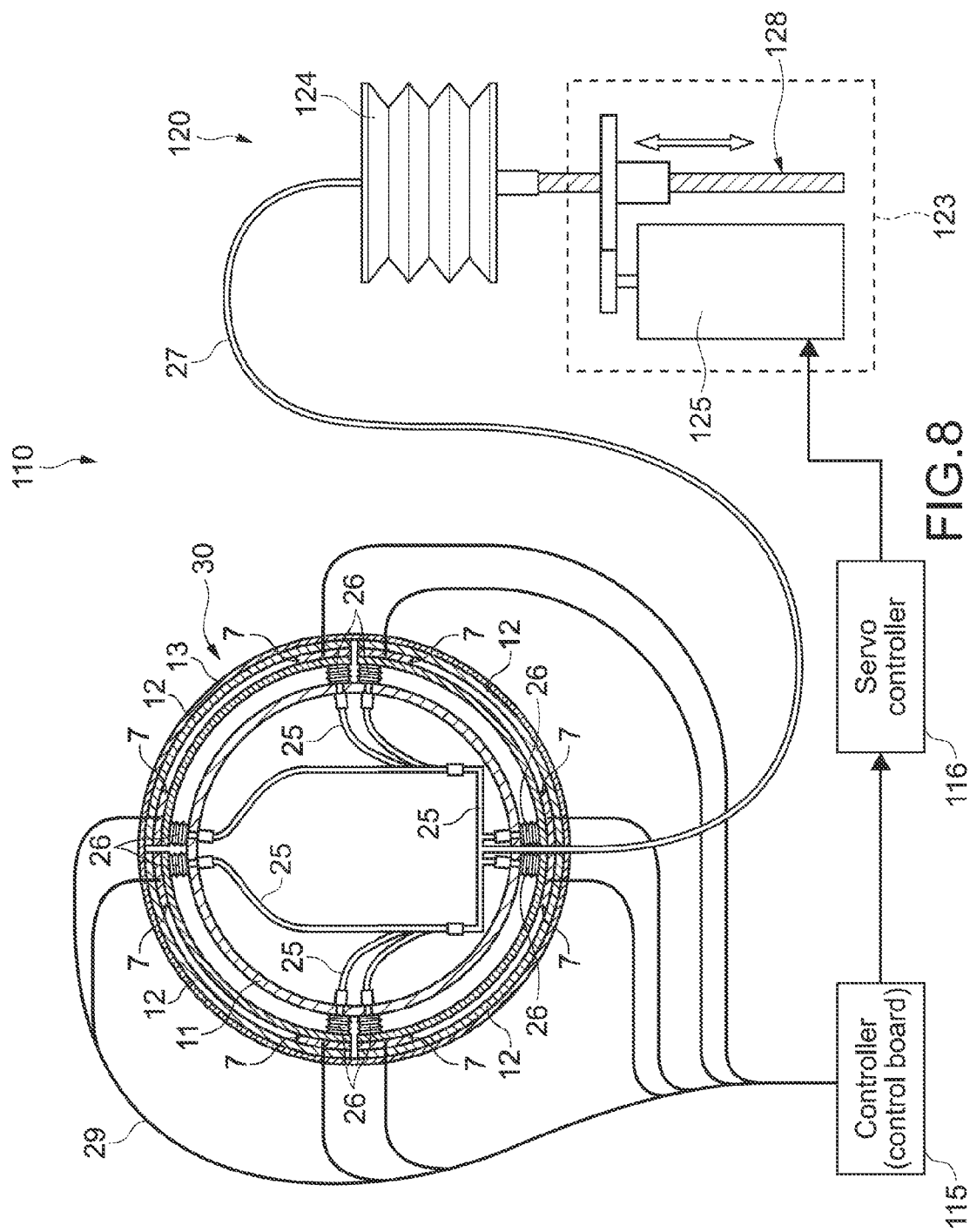
FIG. 8 is a diagram showing an operation apparatus according to a second embodiment of the present disclosure.

FIG. 8 is a diagram showing an operation apparatus according to a second embodiment of the present disclosure.

In the following description, description on the same members, functions, and the like as those included in the operation apparatus 10 according to the first embodiment is simplified or omitted, and only different points will mainly be described.

This operation apparatus 110 includes a spherical input device 30 and a drive unit 120 that is connected to the input device 30 and drives bellows 26.

A difference between the input device 30 and the above-described operation apparatus 10 shown in FIG. 2 is that the input device 30 does not incorporate the drive source 23, the center bellows 24, and the like in the base 11, and the drive source 23, the center bellows 24, and the like are arranged outside the input device 30.

The drive unit 120 includes a drive source 123, a center bellows 124, a controller (control board) 115, and the like. A tube 27 is connected between the center bellows 124 and the tubes 25 of the base 11, and via the tube 27, air is sent to each bellows 26 within the input device 30 from the center bellows 124.

In this embodiment, as the drive source 123, a servo motor 125 and a ball screw 128 connected thereto are provided. The pressure-sensitive sensors 7 and the controller 115 are connected to each other by a conductive wire 29. The controller 115 outputs a command value to a servo controller 116 based on the pressure detected by the pressure-sensitive sensors 7. It should be noted that the control board as the controller 115 may be provided within the base 11, as in the case of the first embodiment described above.

A circuit board on which the acceleration sensor 5, the angular velocity sensor 6, and the like (not shown) (see FIG. 3) are mounted is arranged in the base 11.

As in this embodiment, a part of the drive mechanism 20, which excludes the actuators (bellows 26), is provided to the outside of the input device 30, with the result that the size of the input device 30 can be made smaller than that of the operation apparatus 10 described above.

Third Embodiment

In the first and second embodiments described above, the bellows 26 that are driven by a fluid pressure are used as actuators. In this third embodiment, though not illustrated, an electric actuator that is electrically driven may be used. As the electric actuator, for example, a ball screw mechanism, a rack and pinion mechanism, or a linear motor mechanism (for example, solenoid) that is driven by an electromagnetic action is used.

The operation apparatus 10 includes a driver that individually drives those electric actuators. The driver may be stored in the ROM of the controller 15 shown in FIG. 3, for example, or may be mounted as an IC onto a circuit board separately from the controller 15.

According to the operation apparatus 10, the plates 12 can be driven individually based on the pressurized position and the pressurizing force by the user, with the result that various expressions of feedback can be provided.

Application examples of the operation apparatus 10 include ones similar to the application example of the first embodiment described above.

Other Embodiments

The present disclosure is not limited to the embodiments described above, and other various embodiments thereof are achieved.

In the embodiments described above, the shape of the base 11 is spherical, but the present disclosure is not limited thereto. The shape of the base 11 may be a polyhedron, a columnar body (cylindrical body), a conical body, an oval sphere, a semiregular polyhedron, a mouse shape, or a shape obtained by a combination of at least two of them.

The entire surface of the base is partitioned to set the plurality of regions, but a part of the surface of the base may be partitioned to set a plurality of regions. In this case, the base may have a spherical shape or may have a different three-dimensional shape.

In the embodiments described above, the number of partitioned regions of the surface of the base is eight, but the number may be at least two. For example, in the case where the base has a spherical shape, the spherical shape may be partitioned into two spherical surfaces.

The shape of regions obtained by partitioning the surface of the base is a triangle, but the shape thereof may be a polygon having four or more corners. Further, the areas of those regions may be substantially the same or the areas of at least two regions may be different. For example, in the case where the base has a spherical shape, its surface may be partitioned into regions by a partitioning line such as a longitude line of a globe. Alternatively, in the case where the base has a spherical shape, its surface may be partitioned into regions by a plurality of pentagons and hexagons, like a soccer ball.

The bellows 26 and the electric actuators in the embodiments described above are arranged at the positions corresponding to the pressure-sensitive sensors 7 (positions immediately below the pressure-sensitive sensors 7). However, in the arrangement of those actuators, one actuator may be arranged at the center of the plate 12 or one or a plurality of actuators may be arranged at a portion of the plate 12, except the center and an edge portion thereof.

In the first and second embodiments, the bellows 26 are used as actuators. However, a cylinder mechanism that is driven by a balloon or a gas pressure may be used. Further, an inert gas or liquid such as water may be used as a working fluid for those bellows 26, the balloon, and the cylinder mechanism.

The operation apparatus 10 and the input device 30 according to the embodiments described above each include the acceleration sensor 5 and the angular velocity sensor 6. However, those apparatuses may include the pressure-sensitive sensors 7 and may not include at least one of the acceleration sensor 5 and the angular velocity sensor 6.

In the embodiments described above, the pressure-sensitive sensors 7 are arranged between the upper plate 12a and the lower plate 12b. However, for example, the pressure-sensitive sensors may be arranged between the surface of the base and a plurality of plates (the number of plates in this case is not limited to two and may be one). In this case, the arrangement of actuators (bellows, cylinder, or electric actuator) has the following two forms.

In the first form, a plurality of second plates are further arranged on the outside of the former plurality of plates so as to cover and correspond to the former plates. Then, actuators are arranged between the inner plates and the outer plates (second plates).

In the second form, actuators are arranged between the surface of the base and a plurality of plates.

In both the cases, regarding the number of actuators and positions thereof in one region (region corresponding to one plate) of the plurality of regions obtained by partitioning at least a part of the surface of the base, any arrangement may be adopted.

The "signal generated by detection by the sensing unit" described above is not limited to a signal including information of a pressurized position and a pressurizing force. The signal includes a signal in which a pressure has a constant value and other signals. For example, in the case where a pressure detected by one sensing unit exceeds a threshold value or a scalar sum or a vector sum of a plurality of sensing units exceeds a threshold value, a controller may generate a control signal for a drive mechanism to drive actuators.

In this case, the sensing unit may also be used as an ON/OFF switch. Further, there is a wide variation on the way for the drive mechanism to drive actuators in this case.

Out of the characteristic parts of the embodiments as described above, at least two of them can be combined with each other.

The present disclosure can also take the following structures.

(1) An operation apparatus, including:
 a base having a surface;
 a sensing unit including at least three pressure-sensitive detection regions that are provided at different vertex positions of a polygon having at least three corners set in each of a plurality of regions obtained by partitioning at least a part of the surface of the base;
 a plurality of plates that are provided to correspond to the plurality of regions and cover the at least a part of the surface; and
 a drive mechanism configured to drive the plurality of plates on the basis of a signal generated by detection of the sensing unit.

(2) The operation apparatus according to Item (1), in which
 the drive mechanism includes a plurality of actuators that are each provided between the surface of the base and each of the plurality of plates.

(3) The operation apparatus according to Item (2), in which
 the plurality of actuators are bellows that are driven by a fluid pressure.

(4) The operation apparatus according to Item (2), in which
 the drive mechanism includes a drive source that is provided within the base and causes the plurality of actuators to individually generate a drive force.

(5) The operation apparatus according to Item (2) or (4), in which
 the plurality of actuators are electric actuators that are electrically driven.

(6) The operation apparatus according to any one of Items (2) to (5), in which the base has a spherical shape.

(7) The operation apparatus according to Item (6), in which the plurality of plates include eight triangular plates that cover the entire surface of the base.

(8) The operation apparatus according to any one of Items (1) to (7), further including a position sensor that is provided within the base and detects a position of the base.

(9) The operation apparatus according to any one of Items (1) to (8), further including a cover sheet that covers the plurality of plates.

The present disclosure contains subject matter related to that disclosed in Japanese Priority Patent Application JP 2011-084149 filed in the Japan Patent Office on Apr. 6, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An operation apparatus, comprising:
   a base having a surface;
   a sensing unit including at least three pressure-sensitive detection regions that are provided at different vertex positions of a polygon having at least three corners set in each of a plurality of regions obtained by partitioning at least a part of the surface of the base;
   a plurality of plates that are provided to correspond to the plurality of regions and cover the at least a part of the surface; and
   a drive mechanism configured to drive the plurality of plates on the basis of a signal generated by detection of the sensing unit;
   the drive mechanism includes a plurality of actuators that are each provided between the surface of the base and each of the plurality of plates.

2. The operation apparatus according to claim 1, wherein the plurality of actuators are bellows that are driven by a fluid pressure.

3. The operation apparatus according to claim 1, wherein the drive mechanism includes a drive source that is provided within the base and causes the plurality of actuators to individually generate a drive force.

4. The operation apparatus according to claim 1, wherein the plurality of actuators are electric actuators that are electrically driven.

5. The operation apparatus according to claim 1, wherein the base has a spherical shape.

6. The operation apparatus according to claim 5, wherein the plurality of plates include eight triangular plates that cover the entire surface of the base.

7. The operation apparatus according to claim 1, further comprising a position sensor that is provided within the base and detects a position of the base.

8. The operation apparatus according to claim 1, further comprising a cover sheet that covers the plurality of plates.

9. An operation apparatus, comprising:
   a base having a surface;
   a sensing unit including at least three pressure-sensitive detection regions that are provided at different vertex positions of a polygon having at least three corners set in each of a plurality of regions obtained by partitioning at least a part of the surface of the base;
   a plurality of plates that are provided to correspond to the plurality of regions and cover the at least a part of the surface;
   a drive mechanism configured to drive the plurality of plates on the basis of a signal generated by detection of the sensing unit; and
   a position sensor that is provided within the base and detects a position of the base.

* * * * *